F. FISHER.
MOWING MACHINE.
APPLICATION FILED JAN. 9, 1908.

914,258.

Patented Mar. 2, 1909.
2 SHEETS—SHEET 2.

Witnesses
C. E. Smith.
C. N. Griesbauer.

Inventor
Fred Fisher.
By H. B. Willson & Co.
Attorneys

UNITED STATES PATENT OFFICE.

FRED FISHER, OF WEST POINT, KENTUCKY, ASSIGNOR TO T. C. WILLIAMS, OF WEST POINT, KENTUCKY.

MOWING-MACHINE.

No. 914,258.

Specification of Letters Patent.

Patented March 2, 1909.

Application filed January 9, 1908. Serial No. 409,997.

*To all whom it may concern:*

Be it known that I, FRED FISHER, a citizen of the United States, residing at West Point, in the county of Hardin and State of Kentucky, have invented certain new and useful Improvements in Mowing-Machines; and I do declare the following to be a full, clear, and exact description of the invention, such as will enable others skilled in the art to which it appertains to make and use the same.

My invention relates to mowing machines, and the object of the invention is to increase the efficiency of such machines whereby less horse-power is required to run the same, and whereby the parts are easily replaced and repaired by any inexperienced workman.

A further object of the invention is the provision of novel means for raising and lowering the sickle bar and for throwing it out of action, whereby the machine may be run from place to place without operating the sickle bar.

A further object of the invention is the provision of novel means for supporting the various parts upon the frame, and for shifting the gearing so that the power may be applied or disconnected at a moment's notice.

With these objects in view, the invention consists of certain novel features of construction, combination and arrangement of parts as will be described hereinafter and particularly pointed out in the appended claims.

Figure 1:
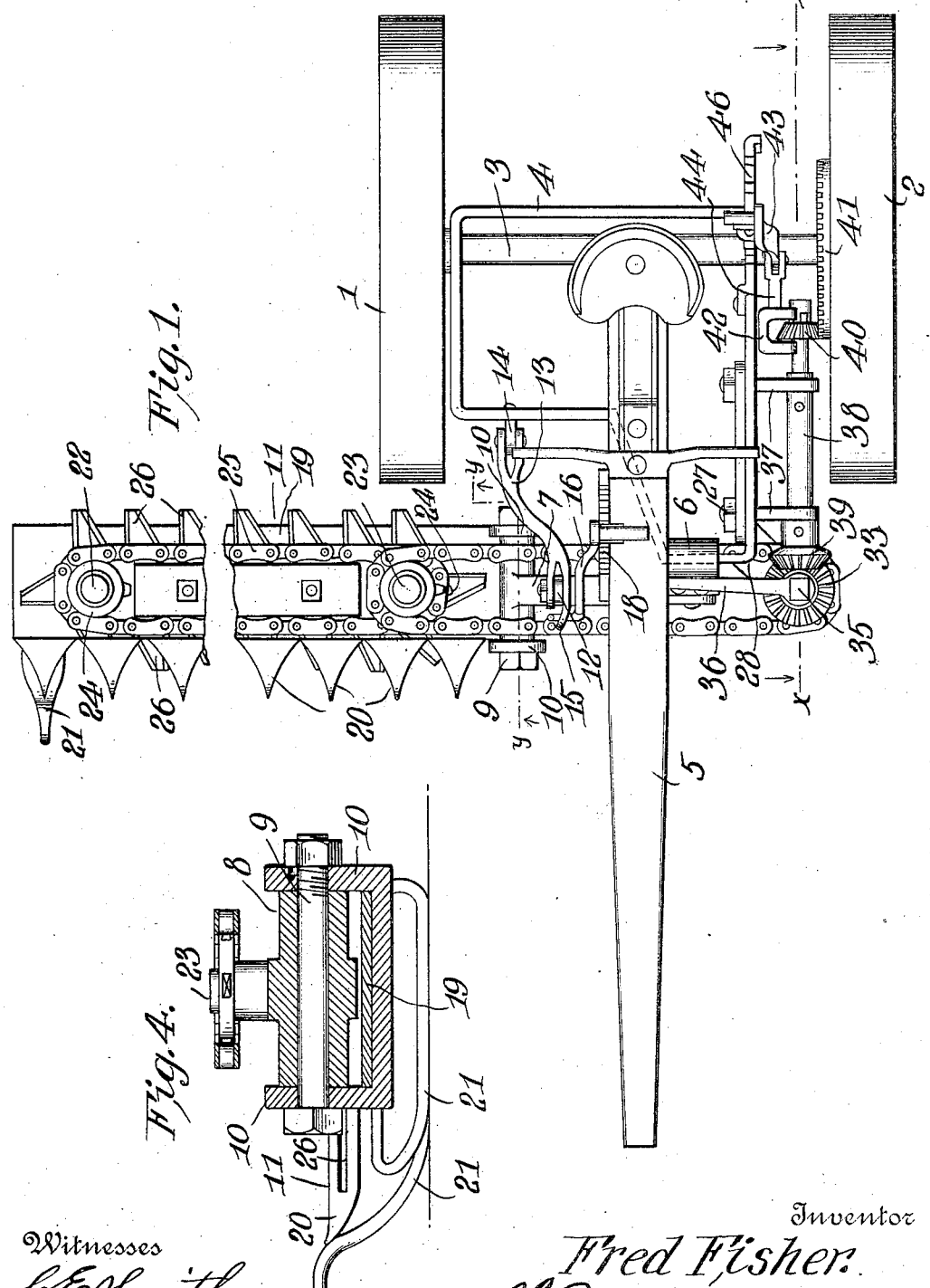
Figure 2:
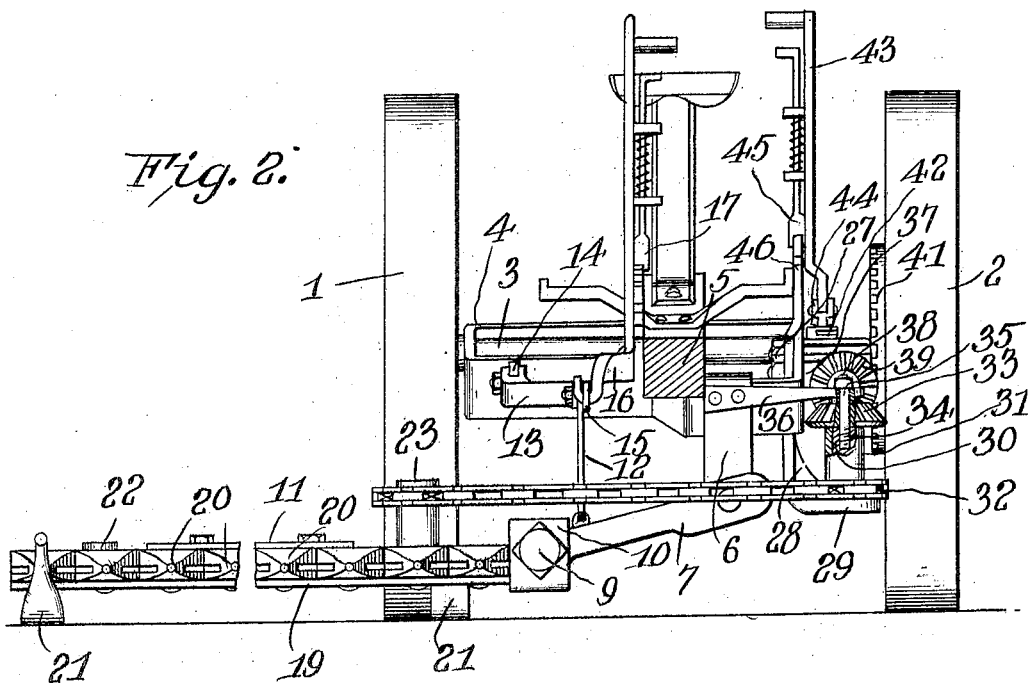
Figure 3:
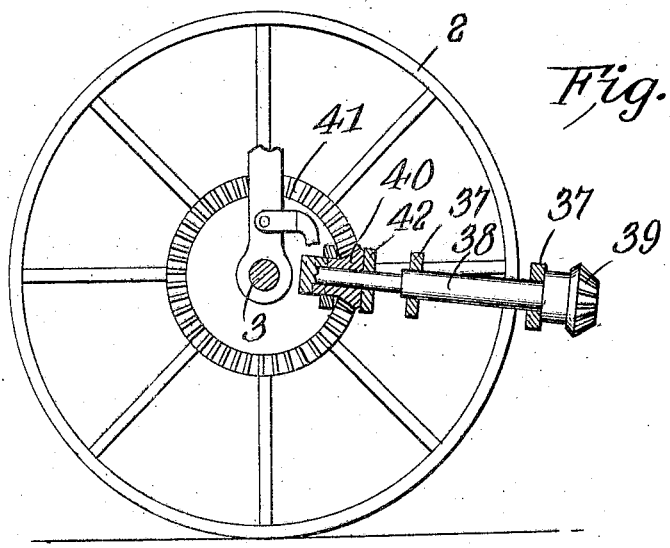

In the accompanying drawings, Figure 1 is a top plan view; Fig. 2 is a front elevation partly in section; Fig. 3 is a longitudinal sectional view on the line *x—x* of Fig. 1; and Fig. 4 is a detail sectional view on the line *y—y* of Fig. 1.

Referring more especially to the drawings, 1 and 2 represent the supporting wheels of the device, which are connected by an axle, 3. A frame, 4, is suitably pivoted upon the axle adjacent its rear end and extends forwardly, where it is connected with a tongue, 5. This frame is preferably formed of a single casting, and is substantially rectangular in form, except adjacent its forward end, where it is offset to form a connection with the tongue, 5. Depending from the frame, 4, adjacent the left-hand side of the tongue, 5, is a supporting member, 6, to the lower end of which is pivoted a link, 7, having its outer end provided with a transverse cylindrical sleeve, 8, which is adapted to receive a pivot bolt, 9, carried by the upwardly extending ears, 10, of the sickle bar frame, 11. Projecting upwardly from the link, 7, adjacent its connection with the cylindrical sleeve, 8, is a standard, 12, which is connected at its upper end with a bracing rod, 13. This bracing rod is bifurcated at both ends and one takes over the standard 12, and is secured thereto, and the opposite end is pivotally connected to a lug, 14, projecting from the opposite end of the frame. One of the legs of the bifurcated end of the bracing rod projects beyond the standard, as at 15, where it is pivotally connected with a bell crank lever, 16, pivoted upon the tongue, 5, and carrying a spring-retracted pawl, 17, adapted to work over a toothed segment, 18, carried upon the tongue.

The sickle bar frame is composed of a plate, 19, to which is securely attached the sickle bar fingers, 20, of the usual construction, and the runners, 21. Journaled at each end of the frame are stub shafts, 22 and 23, and mounted for rotation upon each of the stub shafts is a sprocket wheel, 24, around which travels the sprocket chain, 25. Secured to each link of the sprocket chain are the cutting blades, 26, as clearly shown in Fig. 1.

Rigidly secured to the frame, 4, adjacent the supporting member, 6, by bolts, 27, is a depending frame, 28, having a right-angular horizontal extension, 29, in which is secured a stub shaft, 30, having mounted thereupon a sleeve, 31, carrying at its lower end a sprocket wheel, 32, and at its upper end a bevel gear, 33. The stub shaft is apertured in its upper end as at 34, and is threaded to receive a set screw, 35, carried by a bracing arm, 36, rigidly secured to and projecting laterally from the supporting member, 6. The bolts 27 are formed integral with ears, 37, which have alined apertures to receive a power shaft, 38, upon the outer end of which is keyed a bevel pinion, 39, adapted to mesh with the bevel gear, 33. The opposite end of the shaft, 38, is reduced and splined, and on it is a bevel pinion, 40, adapted for rotation with the shaft and for free longitudinal movement upon its reduced end. This pinion 40 meshes with a gear, 41, carried upon the wheel, 2, and is thrown into and out of mesh therewith by a U-shaped clip, 42, connected to the operating lever, 43, by a link, 44. This lever 43 is provided with a spring-retracted pawl, 45, which operates over a notched segment, 46.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus fully described my invention, what I claim as new, and desire to secure by Letters-Patent, is:

In a mowing machine, a main frame, an auxiliary frame depending therefrom, a cutter bar support pivoted to said auxiliary frame, a cutter bar pivoted on said support, an endless cutter carried by the cutter bar, a support depending from the main frame and having a right-angular bearing arm, a shaft journaled therein, means extending from the auxiliary frame to the shaft for supporting the upper end thereof, a sprocket wheel on said shaft, a flexible connection from said sprocket wheel to the endless carrier, means for driving said sprocket wheel and means for raising and lowering said cutter bar support.

In testimony whereof I have hereunto set my hand in presence of two subscribing witnesses.

FRED FISHER.

Witnesses:
  J. S. HUGHES,
  C. M. McGLOTHLUN.